US009510240B2

United States Patent
Lorca Hernando

(10) Patent No.: US 9,510,240 B2
(45) Date of Patent: Nov. 29, 2016

(54) METHOD FOR IMPLEMENTING A CELL LOAD BALANCING MECHANISM IN WIRELESS NETWORKS

(71) Applicant: Telefonica, S.A., Madrid (ES)

(72) Inventor: Javier Lorca Hernando, Madrid (ES)

(73) Assignee: Telefonica, S.A., Madrid (ES)

( * ) Notice: Subject to any disclaimer, the term of this patent is extended or adjusted under 35 U.S.C. 154(b) by 0 days.

(21) Appl. No.: 14/417,418

(22) PCT Filed: Jul. 23, 2013

(86) PCT No.: PCT/EP2013/065481
§ 371 (c)(1),
(2) Date: Jan. 26, 2015

(87) PCT Pub. No.: WO2014/016280
PCT Pub. Date: Jan. 30, 2014

(65) Prior Publication Data
US 2015/0208280 A1   Jul. 23, 2015

(30) Foreign Application Priority Data
Jul. 27, 2012   (ES) .................................. 201231218

(51) Int. Cl.
*H04W 28/08*   (2009.01)
*H04W 16/08*   (2009.01)
*H04W 48/20*   (2009.01)
*H04W 24/02*   (2009.01)
(Continued)

(52) U.S. Cl.
CPC ........... *H04W 28/085* (2013.01); *H04W 16/08* (2013.01); *H04W 28/08* (2013.01); *H04W 48/20* (2013.01); *H04L 47/14* (2013.01); *H04W 24/02* (2013.01); *H04W 36/22* (2013.01); *H04W 72/0486* (2013.01)

(58) Field of Classification Search
None
See application file for complete search history.

(56) References Cited

U.S. PATENT DOCUMENTS 5,794,140 A  *  8/1998  Sawyer  ............... H04L 41/0896
                                                        455/406
6,580,899 B1 *  6/2003  Dalgleish  .............. H04W 52/34
                                                        455/522
(Continued)

FOREIGN PATENT DOCUMENTS

EP   2 373 107 A1   10/2011
WO   03/069940 A1    8/2003

OTHER PUBLICATIONS

"Details on Load Balancing and ICIC signaling Mechanism", 3rd Generation Partnership Project (3GPP), Feb. 5, 2008, RAN WG3, Sorrento, Italy.

(Continued)

*Primary Examiner* — Bunjob Jaroenchonwanit
(74) *Attorney, Agent, or Firm* — Sughrue Mion, PLLC

(57) ABSTRACT

The method comprising at least one wireless user terminal, UE, connected through a wireless network to a serving base station and a plurality of network cells, each one comprising a base station, said at least one wireless UE: estimating the cell loads of the serving base station and of the plurality of network cells by analysing a downlink air interface load; providing to said wireless network, information about the actual cell load estimation of said plurality of cells, and performing a network cell selection based on said estimated cell loads, wherein said cell selection is performed without any exchange of cell load between said plurality of network cells.

17 Claims, 10 Drawing Sheets

(51) Int. Cl.
*H04W 36/22* (2009.01)
*H04W 72/04* (2009.01)
*H04L 12/801* (2013.01)

(56) References Cited

U.S. PATENT DOCUMENTS

| | | | | |
|---|---|---|---|---|
| 8,068,838 B1* | 11/2011 | Dinan | H04W 36/22 | 370/331 |
| 8,305,969 B2* | 11/2012 | Nobukiyo | H04L 1/0021 | 370/320 |
| 2002/0077113 A1* | 6/2002 | Spaling | H04W 24/08 | 455/453 |
| 2004/0157618 A1* | 8/2004 | Brouwer | H04L 1/0001 | 455/453 |
| 2005/0250527 A1* | 11/2005 | Jugl | H04W 16/06 | 455/522 |
| 2006/0258343 A1* | 11/2006 | Schotten | H04W 24/08 | 455/418 |
| 2008/0037497 A1* | 2/2008 | Ludovico | H04W 16/18 | 370/341 |
| 2008/0188247 A1* | 8/2008 | Worrall | H04W 68/025 | 455/458 |
| 2009/0047955 A1* | 2/2009 | Frenger | H04J 11/0093 | 455/436 |
| 2009/0137251 A1* | 5/2009 | Ji | H04W 36/22 | 455/437 |
| 2010/0061343 A1* | 3/2010 | Kazmi | H04W 36/0088 | 370/332 |
| 2010/0113009 A1* | 5/2010 | Jeong | H04W 36/0094 | 455/423 |
| 2010/0188997 A1* | 7/2010 | Aoyama | H04W 16/22 | 370/252 |
| 2010/0227627 A1* | 9/2010 | Ishii | H04W 60/04 | 455/456.2 |
| 2010/0323631 A1* | 12/2010 | Martin | H04B 17/0067 | 455/67.11 |
| 2011/0038431 A1* | 2/2011 | Frederiksen | H04W 24/02 | 375/259 |
| 2011/0070897 A1* | 3/2011 | Tang | H04W 24/02 | 455/456.1 |
| 2011/0103249 A1* | 5/2011 | Kim | H04W 24/10 | 370/252 |
| 2011/0171952 A1* | 7/2011 | Niu | H04L 43/0882 | 455/422.1 |
| 2011/0222416 A1* | 9/2011 | Damnjanovic | H04W 72/12 | 370/252 |
| 2011/0263271 A1* | 10/2011 | Hoymann | H04B 7/024 | 455/456.1 |
| 2011/0280141 A1* | 11/2011 | Chin | H04W 36/0088 | 370/252 |
| 2011/0306346 A1* | 12/2011 | Yoon | H04W 36/30 | 455/437 |
| 2012/0015649 A1* | 1/2012 | Li | H04W 36/0061 | 455/434 |
| 2012/0021748 A1* | 1/2012 | Ostrup | H04W 36/0061 | 455/437 |
| 2012/0094651 A1* | 4/2012 | Chun | H04W 36/0027 | 455/422.1 |
| 2012/0147828 A1* | 6/2012 | Wigren | H04W 72/1268 | 370/329 |
| 2012/0170458 A1* | 7/2012 | Zee | H04L 5/0048 | 370/232 |
| 2012/0182937 A1* | 7/2012 | Bergstrom | H04W 36/18 | 370/328 |
| 2012/0196617 A1* | 8/2012 | Sun | H04W 36/0061 | 455/456.1 |
| 2012/0213139 A1* | 8/2012 | Zee | H04W 52/26 | 370/311 |
| 2012/0238313 A1* | 9/2012 | Zhou | H04W 52/343 | 455/522 |
| 2012/0294210 A1* | 11/2012 | Jiang | H04W 72/1289 | 370/280 |
| 2013/0012260 A1* | 1/2013 | Salkintzis | H04W 48/08 | 455/550.1 |
| 2013/0034081 A1* | 2/2013 | Ban | H04W 36/16 | 370/331 |
| 2013/0040683 A1* | 2/2013 | Siomina | H04W 28/0236 | 455/517 |
| 2013/0044616 A1* | 2/2013 | Scholand | H04L 1/0027 | 370/252 |
| 2013/0059590 A1* | 3/2013 | Teyeb | H04W 36/0061 | 455/438 |
| 2013/0084870 A1* | 4/2013 | Nylander | H04W 36/0061 | 455/436 |
| 2013/0100846 A1* | 4/2013 | Park | H04W 24/10 | 370/252 |
| 2013/0194921 A1* | 8/2013 | Zhang | H04L 47/10 | 370/230 |
| 2013/0308445 A1* | 11/2013 | Xiang | H04W 28/0231 | 370/230 |
| 2014/0018073 A1* | 1/2014 | Frenger | H04J 11/0093 | 455/434 |
| 2014/0198657 A1* | 7/2014 | Ji | H04W 28/08 | 370/235 |
| 2014/0307546 A1* | 10/2014 | Zhou | H04L 41/0893 | 370/230 |
| 2015/0055479 A1* | 2/2015 | Reider | H04W 36/22 | 370/236 |
| 2015/0092562 A1* | 4/2015 | Gu | H04W 52/343 | 370/237 |
| 2015/0141069 A1* | 5/2015 | Wigren | H04W 24/00 | 455/522 |
| 2015/0208419 A1* | 7/2015 | Wigren | H04W 72/1252 | 370/335 |
| 2015/0215918 A1* | 7/2015 | Wu | H04W 72/0433 | 370/329 |

OTHER PUBLICATIONS

International Search Report for PCT/EP2013/065481 dated Oct. 30, 2013.

* cited by examiner

METHOD FOR IMPLEMENTING A CELL LOAD BALANCING MECHANISM IN WIRELESS NETWORKS

This application is a National Stage of International Application No. PCT/EP2013/065481 filed Jul. 23, 2013, claiming priority based on Spanish Patent Application No. P201231218 filed Jul. 27, 2012, the contents of all of which are incorporated herein by reference in their entirety.

FIELD OF THE ART

The present invention generally relates, to a method for data transmission in wireless networks, and more particularly, to a method for implementing a cell load balancing mechanism in wireless networks.

PRIOR STATE OF THE ART

Universal Mobile Telecommunication System (UMTS) is a 3GPP standard based on Wideband Code Division Multiple Access (WCDMA), and represents the main third generation air interface in the world, with deployments over Europe, Asia and USA. The first release of UMTS, denoted as Release 99, provided circuit-based connections up to a maximum of 2 Mbps, although actual maximum data rates of 384 kbps were usually delivered [1]. UMTS Release 5, also known as High Speed Downlink Packet Access (HSDPA), provided efficient packet-based downlink connections with a maximum rate of 14.4 Mbps [2]. UMTS Release 6, also known as High Speed Uplink Packet Access (HSUPA) or Enhanced Uplink (EUL), provided high-speed uplink connections with a much lower latency [3]. Both HSDPA and HSUPA are collectively known as HSPA, and represent the main enabler for the explosion of wireless data-hungry smartphone applications.

Long-Term Evolution (LTE) is the next step in cellular 3G systems, which represents basically an evolution of present mobile communications standards [4]. It is a 3GPP standard that provides throughputs up to 50 Mbps in uplink and up to 100 Mbps in downlink. It uses scalable bandwidth from 1.4 to 20 MHz in order to suit the needs of network operators that have different bandwidth allocations. LTE is also expected to improve spectral efficiency in networks, allowing carriers to provide more data and voice services over a given bandwidth.

On the other hand, non-3GPP radio access technologies (such as Wi-Fi) are becoming more and more prevalent as home or public wireless networking technologies. Although the intended scenario for each technology is different, in many cases it would be desirable to perform specific cell balancing strategies aimed at off-loading part of the wireless traffic. A typical use case is cellular data off-loading through Wi-Fi access points, but other more complex possibilities exist involving several frequencies and/or cells from different layers (i.e. macro, micro, pico and/or femto layers).

Nowadays, there is a growing interest in investigating joint radio resource management (RRM) mechanisms considering several different radio access technologies (RATs) as a whole access network that connects the users to the packet-based core. It is advantageous to consider e.g. 2G, 3G, WiFi and LTE technologies as different possible access alternatives for which load balancing can be accomplished through specific RRM strategies. These load balancing procedures are highly complex to implement for several reasons:

Each radio access technology has different inherent service capabilities, which in some situations precludes a seamless balancing between them. For example, high-speed data services cannot be supported by legacy 2G networks, and initial LTE deployments with no VoLTE support will not have voice capability other than fallback to 3G/2G legacy networks.

Load balancing mechanisms usually involve the interaction of different network nodes for the exchange of cell load information, and this information exchange is not fully standardized prior to 3GPP Release [9 5]. Due to this lack of standardization, nodes from different vendors cannot usually communicate with each other for load balancing purposes. Additionally, present legacy networks may present important issues when trying to perform major upgrades such as the ones required for inter- and intra-RAT load balancing, because existing interfaces may not support the capacity required for such information exchange.

Traffic steering in traditional planned access networks is a delicate radio procedure because it forces the users to connect to a cell other than the one with the best radio conditions. The target signal to interference plus noise ratio (SINR) may usually be worse than that of the best cell, and this should be compensated by a lower cell load (which could result in a higher perceived throughput). This comes at the expense of the UE operating in poorer SINR conditions, which can be especially harmful for the detection of control channels.

Despite these challenges, it is highly desirable to investigate effective load balancing mechanisms for traffic off-loading between different cells, technologies and/or frequencies.

But, although many proprietary solutions exist for load balancing, they are usually non-interoperable unless the affected nodes understand the same protocols.

In order to facilitate inter-RAT load exchange, 3GPP Releases 9 and 10 standardize a load exchange procedure on top of the RIM protocol (RAN Information Management), designed to be independent of the handover procedure, so that it can be triggered at any time by a base station [5]. However this load exchange must traverse several core network nodes, hence resulting in significant signaling congestion if accurate and up-to-date load information is required. Moreover, the relevant nodes should support this feature which in general means upgrading a significant number of network nodes.

The load information exchange supported by RIM is however somewhat limited [5]. Extensions of the RIM protocol are being proposed [16], but still remain out of the standardization bodies hence being not universally interoperable.

The load information exchange is aimed at modifying the handover algorithms in order to steer connected mode users to a different cell, be it in the same frequency, in another frequency or even in a different RAT. Handover algorithms are proprietary and commanded by the access nodes in 3GPP networks, but should be consistent with cell selection and reselection parameters so that idle mode UEs camp on the most suitable cell. Measurement reports may be configured by the network to control UE mobility in connected mode, e.g. after having triggered an event (such as the serving cell becoming worse than an absolute threshold during a time interval), but handover decisions are dependent on actual implementations.

Idle mode mobility can be controlled by broadcast parameters related with cell selection and reselection. These parameters might change so as to force the UEs to camp on a different cell according to its load as proposed in patent application US 2006/0128394 A1. To prevent ping-pong effects, those parameters should be modified in both source and target cells, but with reversed signs: e.g. if the source cell applies an offset +X, the target cell should also apply an offset −X for consistency. This can lead to conflicting situations as the one depicted in FIG. 1.

A user UE1 located near the edge between cells A and B (but closer to A) camps on cell A. If cell loads of 90% and 50% for cells A and B, respectively, are assumed it can be advisable to move UE1 towards cell B even in idle mode. The corresponding reselection parameters should then be modified by means of an offset on the measured power/quality of cells A and B, with opposite signs. If e.g. a positive offset should be applied on cell A for an outwards movement of the user, a negative offset should then be applied on B for consistency. Simultaneously, a user UE2 located near the edge between cells C and B camps on cell B. The lower load in cell C (20%) makes it reasonable to steer UE2 towards cell C, by applying appropriate offsets. These offsets should be positive for cell B and negative for cell C. Hence, contradictory biasing decisions are to be taken in cell B for steering different users. Heterogeneous scenarios would suffer from the same problem, irrespective of the actual cell sizes.

In addition to 3GPP-based inter-RAT cell balancing (involving GSM/GPRS, UMTS, HSPA, CDMA2000 and/or LTE) non-3GPP inter-technology cell balancing mechanisms can also be considered (involving e.g. Wi-Fi or WiMAX). In this latter case there exist several solutions aimed at helping the UE in the discovery and selection of the appropriate technology, as well as re-routing traffic towards the core packet network or the public Internet. Examples of such solutions are ANDSF [10], I-WLAN [11] and IEEE 802.11u [12]. None of these solutions are at present considering cell load as an input for technology selection.

Moreover, the growing interest in heterogeneous networks (commonly known as "HetNets") composed of a mixture of macro, micro, pico and/or femto cells in the same or different frequencies, introduces additional challenges for effective traffic steering. In addition to increased interference and mobility issues [13], efficient load balancing mechanisms demand agile information exchange between different layers, which in many cases can be very complicated due to the absence of a direct interface between cells. As an example, LTE Release 8 femto cells operating in the coverage region of a macro cell lack for an appropriate X2 interface with the macro eNodeB, hence load information exchange would presumably have a large latency. Other time-based resource coordination mechanisms, such as those based on so-called Almost Blank Subframes (ABS), allow for an indirect estimation of the load in LTE cells. However they are based on LTE Release 10 and require tight synchronization between layers, as well as appropriate X2 signaling.

Another solution is the one proposed in the patent U.S. Pat. No. 7,941,155 B2 which involves broadcasting load information of the neighbour cells, so that the terminals may take advantage of this information for cell reselections and handovers. Cell load information should therefore be exchanged between the relevant nodes in order to be incorporated into the neighbour list information. If the cells belong to different radio access technologies the exchange of load information can be an important issue. Moreover, such information exchange requires upgrading the relevant interfaces, which in many cases were not designed to support that feature. Up-to-date neighbour cells load information requires significant amount of signaling exchange, which may easily overload the corresponding interfaces. Over-the-air solutions for load information exchange have also been proposed, but remain non-interoperable unless fundamental changes are introduced at all the nodes under consideration as proposes the patent application US 2011/0038431 A1.

Another solution is the one proposed in patent application EP 2373107 A1 providing a method of operating a cellular network. In said method load information is received from a second base station at a mobile station indicating a load placed on the resources of the second base station. A load indication based on the received load information is communicated from the mobile station to a first base station. This solution therefore performs an exchange of cell load indicators between the base stations via backhaul connections, however it does not estimate, via UE, the cell load of a base station serving user equipment or of a set of network cells by analyzing the downlink air interface load.

In yet another solution, load indicator signals are transmitted by the cells so that the UE may receive them in order to determine a suitable transmit power metric for inter-cell interference coordination as it is proposed in US 2011/0222416 A1. This power metric may be provided to a serving base station, which may allocate uplink resources based on the transmit power metric. This solution therefore utilizes load indications in order to control interference to/from neighbour nodes, however not addressing any effective load balancing technique that takes advantage of cell load indications.

It is also important to remark the interest in controlling traffic steering policies from an operator's perspective, making it dependent not only on cell load but also on certain situations (as e.g. the occurrence of especial events, time of the day, emergency situations, and so on).

SUMMARY OF THE INVENTION

The object of the present invention is to provide a cell load reporting mechanism for application on any wireless technology, especially devoted for scenarios where load information exchange between network nodes can represent a major issue by introducing changes on both radio access nodes (base stations and/or radio network controllers) and user terminals aimed at enabling efficient cell load balancing mechanisms.

To that end, the present invention relates to a method for the implementation of a cell load balancing mechanism for wireless networks, as commonly used in the field, comprising:

at least one wireless user terminal, UE, connected through a wireless network to a serving base station; and a plurality of network cells, each one comprising a base station.

On contrary to the known proposals, said at least one wireless user terminal performs following actions:

estimating the cell loads of the serving base station and of the plurality of network cells by analysing a downlink air interface load;

providing to said wireless network information about the actual cell load estimation of said plurality of cells, and performing a network cell selection based on said estimated cell loads, wherein said network cell selection is performed without any exchange of cell load between said plurality of network cells.

In the case of Wideband Code Division Multiple Access, WCDMA, cells, the downlink air interface load is estimated based on the maximum available TX power in the cell, termed as MAX_TX_POWER, said available TX power being included as part of any relevant system information blocks transmitted in a broadcast channel or created within a new of said system information blocks. In particular, the estimation of the downlink air interface load L is given by:

$$L = \frac{P_{TX}}{MAX\_TX\_POWER},$$

wherein $P_{TX}$ denotes the total transmission power as derived from the received powers for each of the channelization codes i, $P_{i,RX}$, and the estimated path loss PL through the equations:

$$P_{TX}(dBm) = \sum_i P_{i,RX}(dBm) + PL(dB)$$

$$PL(dB) = P_{CPICH,TX}(dBm) - P_{CPICH,RX}(dBm),$$

where $P_{CPICH,TX}$ denotes the transmitted power of the Common Pilot Channel, CPICH, as broadcast by the network cell, and $P_{CPICH,RX}$ is the received CPICH power.

In case of Long Term Evolution cells the downlink air interface load is estimated based on an averaged number of occupied resource elements in a subframe, particularly, said estimation of the downlink air interface load L is given by:

$$L = \frac{N_{REs,occupied}}{N_{REs,total}},$$

where $N_{REs,occupied}$ denotes the number of occupied resource elements, $N_{REs,total}$ denotes the global number of available resource elements in the network cell, and resource elements are considered to be occupied based on the detected power being higher than a predefined threshold.

According to an embodiment, a further selection termed reselection is performed by said at least one wireless UE.

The cell selection and reselection is performed by said at least one wireless UE being in Idle mode.

According to some embodiments, a neighbour cells load report containing the cell load estimations of the plurality of network cells is also sent by the wireless UE to the serving base station upon entering, said at least one wireless UE, into connected mode, or upon request from said serving base station, or upon a previous serving base station having sent a handover order to said at least one wireless UE towards said serving base station, or at any time when said at least one wireless UE is in connected mode.

Also, the cell load estimation of each one of said plurality of network cells has the form of an integer from 0 to 100 representing a combined estimation of the load of the cell.

The cell selection is performed by incorporating a cell load threshold criteria, and avoiding, the at least one wireless UE, selection of other cell candidates if the estimated cell load is above said threshold criteria.

On the other hand, the cell reselection is performed by the following criterion:

$$\left. \begin{array}{l} R_s = 10\log[f(Q_{meas,s}) \times (1 - L_s/100)] + Q'_{hyst,s} \\ R_n = 10\log[f(Q_{meas,n}) \times (1 - L_n/100)] + Q'_{off,n} \end{array} \right\} \Rightarrow$$

where: said wireless UE chooses the cell with highest R value, and: f represents any downlink throughput curve taken as a reference for the technology being considered; $L_s$ and $L_n$ are the cell loads in serving and neighbour cells; $Q'_{hyst,s}$ and $Q'_{off,n}$ are hysteresis values applied for calculation of R in the serving and neighbour cells respectively; and $Q_{meas,s}$ and $Q_{meas,n}$ are based on signal quality in order to apply the throughput curve.

Finally, the serving base station and at least one neighbour base station can belong to the same or to a different frequency and/or to the same or to a different radio access technology.

BRIEF DESCRIPTION OF THE DRAWINGS

The previous and other advantages and features will be more fully understood from the following detailed description of embodiments, with reference to the attached, which must be considered in an illustrative and non-limiting manner, in which.

DETAILED DESCRIPTION OF SEVERAL EMBODIMENTS

Figure 1:
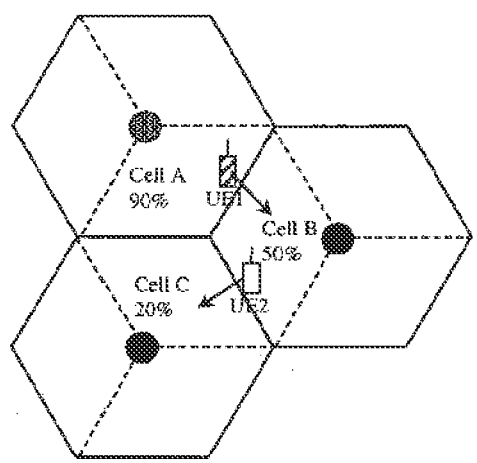
FIG. 1 is an illustration of an Idle mode mobility situation.

The present invention proposes a method for the implementation of a cell load balancing mechanism for wireless networks (such as 3GPP UMTS, HSPA or LTE, but not precluding other wireless access technologies). The invention has the advantage of not requiring the exchange of load information between network nodes, which would represent a major issue for a general inter-RAT load balancing mechanism.

The proposed invention introduces changes in the access nodes (i.e. base stations and/or radio network controllers) as well as changes in the user terminals. Changes in the cells do not involve interaction between them, not requiring cell load information exchange or any upgrade of the corresponding interfaces. Interoperability is thus ensured given that the proposed changes are performed over the relevant network nodes and terminals, the latter acting as anchor nodes for cell load exchange.

The main changes proposed are the following:

1. The base stations belonging to each of the involved RATs shall broadcast a cell load indication, in the form of an integer from 0 to 100 that represents a combined average cell load measure. This indication can be included as part of any relevant System Information Blocks (SIB) transmitted in a broadcast channel (such as BCCH in UMTS and LTE), but any other mechanism is also suitable provided it can be read by any UE in the vicinity of that cell. UEs in Idle mode shall then perform cell selection and reselection with the aid of such cell load indications. Thus, instead of a pure signal-based cell selection and reselection strategy, the UE can perform a suitable load balancing strategy taking into account the corresponding cell loads. If no cell load information is found as part of the broadcast channel, the UE may estimate the cell load making use of over-the-air (OTA) procedures based upon the analysis of the received signals.
2. When the UE enters into connected mode it shall send a cell load report containing the neighbour cells' load indications as read from the broadcast channels (or estimated over the air). The serving cell can therefore take this information into account for eventual cell balancing procedures.
3. Neighbour cell load indications shall also be included as part of the event-triggered measurement reports in connected mode, so as the serving cell can take them into account for handovers. The cell load indications may be read from the corresponding broadcast control channel, or alternatively the UE may perform OTA-based load estimation.
4. When the serving cell sends a handover order to a UE, and in order to avoid ping-pong effects, the target cell should also be aware of the neighbour cells' load indications to avoid subsequent steering of the user towards a different cell. Cell load information exchange can be an important issue if the cells belong to different radio access technologies, or if the interfaces do not support that feature. To overcome this, after completion of the handover the UE shall send a cell load report to the new serving cell so that it is also aware of the cell load conditions in the neighbourhood. Ping-pong effects are thus avoided if subsequent handovers take this information into account.
5. As cell load changes over time, the serving cell may ask the terminal to provide neighbour cell load information at any time when the UE is in connected mode. In this way the serving cell can keep track of the neighbour cells' load for possible handovers even in good signal conditions.

Figure 2:
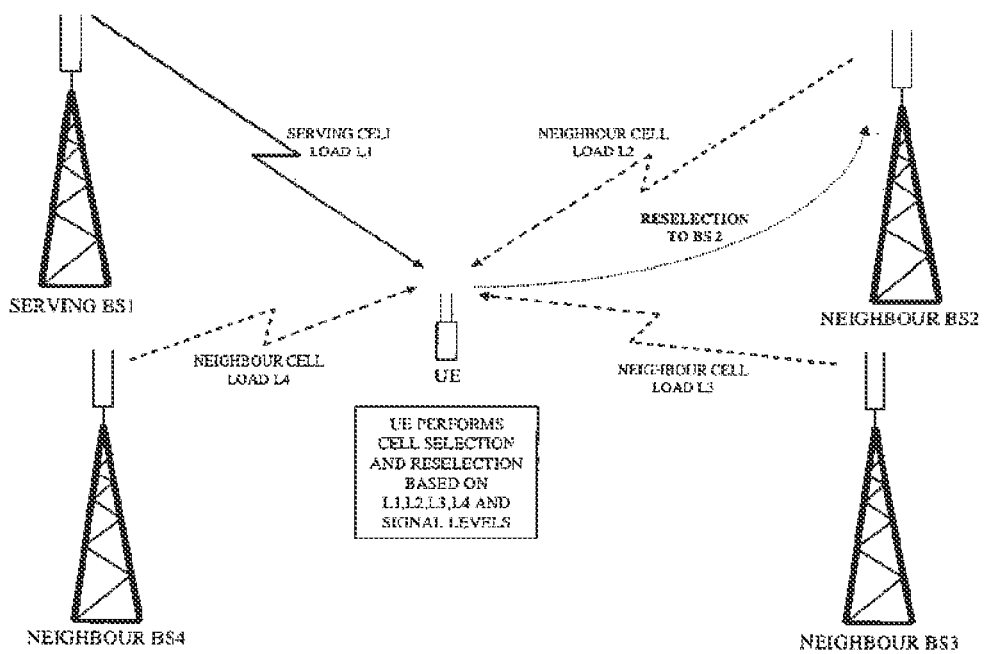
FIGS. 2, 3 and 4 are diagrams showing the main aspects of the present invention, according to an embodiment.

The diagram in FIG. 2 depicts one of the aspects of the concept of the present invention. Cell load indications from the serving cell (L1) and one or more neighbour cells (L2, L3, L4) are broadcast, and the UE performs idle mode selection and reselection based upon these load values as well as signal levels (in the figure, a reselection to BS2 is depicted as an example). If no cell load broadcast information is found by the UE, it may estimate it by a suitable analysis of the downlink air interface signal.

Figure 3:
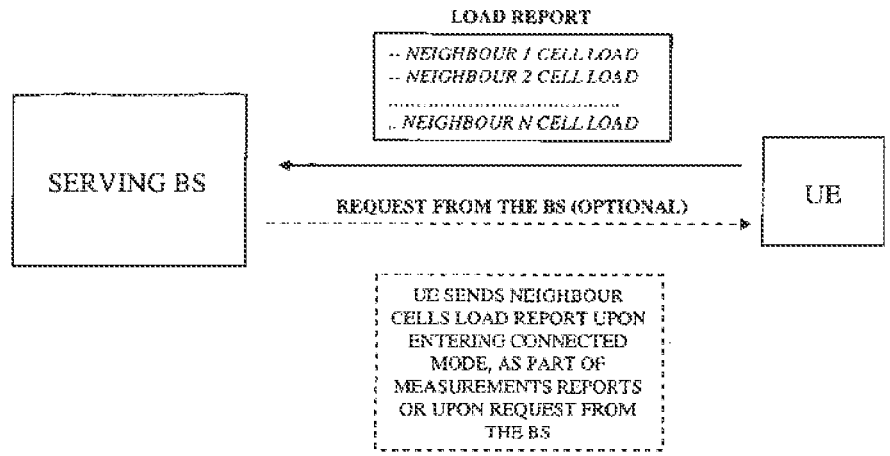

FIG. 3 depicts another aspect of the present invention. The UE sends a neighbour cell load report to the serving base station, containing the cell load indications/measurements of the neighbour cells as seen by the UE. This report is sent upon entering connected mode, as part of the event-triggered measurement reports (which form the basis for eventual handovers), and optionally upon request from the serving base station (depicted in dotted lines).

Figure 4:
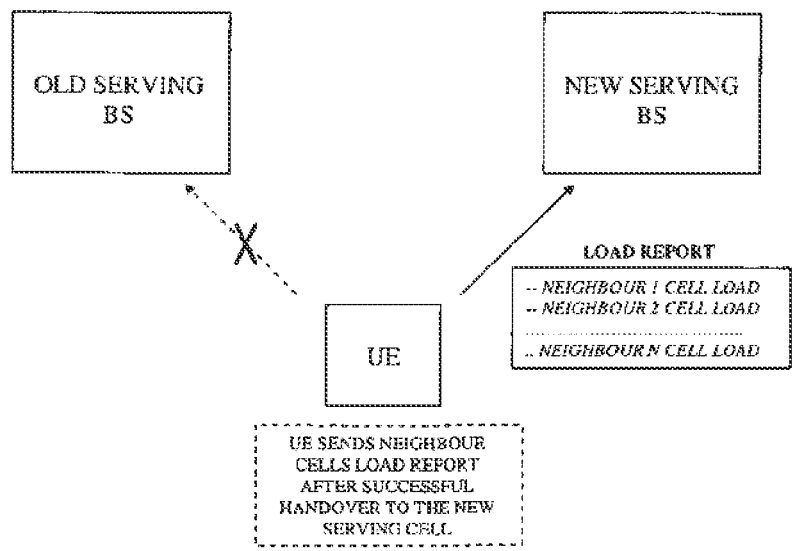

FIG. 4 depicts yet another aspect of the present invention. After a successful handover, the UE sends a detailed neighbour cell load report to the new serving base station. Hence the new serving cell is aware of the cell load indications in the neighbour cells which (possibly) caused a handover from the old serving cell to the new one.

The described cell load information may be updated in a fully dynamic way by the relevant access nodes or in a semi-static way by the Operations System and Support (OSS).

This indication shall be a suitable combination of the following cell load indications:

Downlink air interface cell load, i.e. an indication of the air interface cell load in the downlink. The cell load measurement depends on the technology considered.

Uplink air interface cell load, i.e. an indication of the air interface cell load in the uplink, again dependent on the technology.

Processing cell load, representing a global indication of the used processing resources at the cell. This indication is implementation-specific and should take into account actual hardware and software capabilities of the network equipment's.

Backhaul load, i.e. an indication of the amount of occupied resources on the interface to the rest of the network. As an example, it should be a measure of the occupied resources in the S1 interface for an LTE cell, or in the Iub interface for an UMTS/HSPA cell.

The main advantage of the proposed invention is that no signaling information needs to be exchanged between network nodes, the terminal acting as an anchor node for actual load information exchange. Moreover, it is also responsible for cell reselection decisions based on the broadcast load indication. Own cell load can easily be estimated at the base station, while neighbour cells' load can be extracted from the reports from the UEs. Hence an effective load balancing scheme can be achieved with the interaction between the UEs and the access nodes, irrespective of the radio access technology. Additionally, UEs in Idle mode can perform cell selection and reselection according to the cell load indications, in order to reduce the possible number of handovers after entering connected mode.

The broadcast load indication may be controlled by the operator in a dynamic way in order to force specific balancing policies. For example, upon congestion situations the OSS may configure specific cells with a high cell load indication, in order to force terminals to move towards other cells if possible.

Broadcast of Cell Load Information:

The method for broadcasting cell load information is not completely new; it's part of the state of the art. Although there exists already some proposals to broadcast cell load information, it's necessary to explain the broadcast of cell load information in order to understand the whole process of the present invention.

In order to incorporate cell load information as an additional input for basic mobility radio procedures, it is proposed to include own cell load information in a broadcast message. This message can be included in any of the existing System Information Blocks (SIBs) in 3GPP networks, or created within a new SIB, not precluding any other suitable procedure. The aim of this load information is twofold:

Broadcast control information can be decoded by the terminals in order to read the cell load indications. This can be very useful when performing cell selection and reselection, because the terminals can take into account not only the received signal levels (as is usually specified) but also their cell load indications. This prevents the users from camping on highly-loaded cells, which would result in poor throughput values due to congestion upon entering connected mode.

Access nodes (base stations and/or radio network controllers) may also obtain neighbour cell's load information by using the terminals as anchor points for the exchange of load information. This load information can be reported by the UEs as part of the measurement reports (in connected mode) or upon request from the network. Additionally, and in order to prevent ping-pong effects, neighbour cells' load indications shall also be reported by the UEs to the new serving cell after a handover has taken place.

Figure 5:
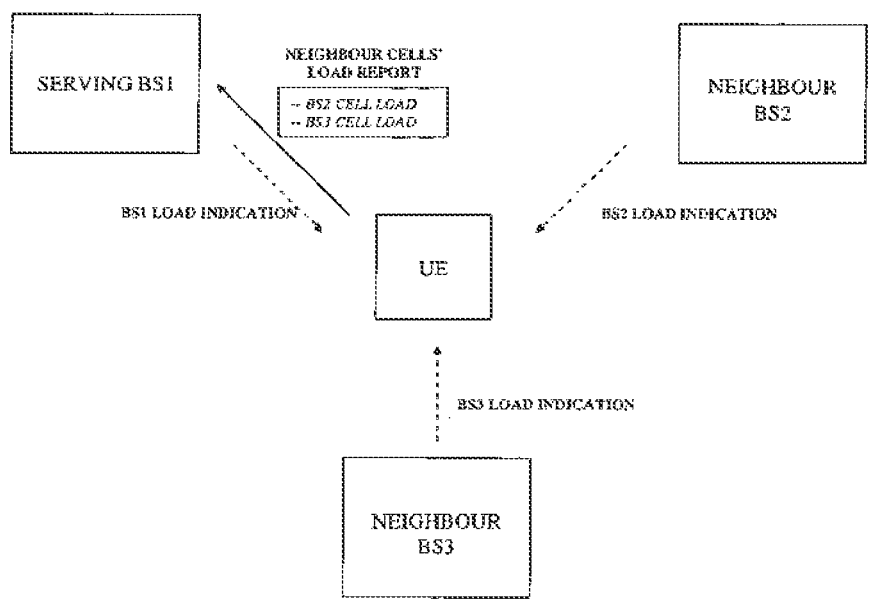
FIG. 5 is a representation of the concept of broadcast cell load information and neighbour cells' load report.

The concept of the cell load information broadcasting is depicted in FIG. 5. Serving base station BS1 broadcasts its cell load indication through a suitable broadcast channel, as well as neighbour cells BS2 and BS3. The UE reads all the cell load indications and performs a suitable cell selection/reselection strategy taking into account the cell load indications. Moreover, the UE sends a neighbour cells' load report to the serving cell, containing the load indications from the neighbour cells when entering connected mode or as part of the measurement reports. If the network orders a handover to a different serving cell, the UE shall also send a suitable neighbour cells' load report to the new serving cell so as it takes this information into account.

When the terminal searches for possible candidates in order to perform cell selection and reselection in Idle mode, it can decode the relevant System Information from the strongest cells hence obtaining the signalled cell load indications. With the aid of this information, the UE may incorporate this criterion for cell camping and reselection so that a less loaded cell may become favoured against a more loaded one, even if the signal quality in the former case is poorer than in the latter case. UEs in Idle mode are not required to report any measurement to the network, thus there are no particular requirements as in connected mode [5] [14].

If no cell load indication is broadcast by a given cell, the UE may also estimate the air interface cell load through appropriate analysis of the received signal. The accuracy of this estimation depends, among other factors, on the technology considered, the SINR of the target cell, the time taken for the measurements and the Discontinuous Reception (DRX) pattern (if applied).

The proposed cell load information shall be an integer from 0 to 100 representing a combined measure of the cell load as explained below.

Cell load computation by the access nodes:

As stated before, this cell load computation performed by the access nodes is not completely new, it's part of the state of the art, but the present invention introduces it because it's necessary in order to understand the whole process.

The cell load indication should combine at least the following indicators. The combination may be based on any useful strategy depending on actual implementations.

1. Downlink air interface load factor. This quantity represents a measure of the downlink air interface resource usage, which is dependent on the radio access technology.

As an example, for WCDMA cells an accurate estimation of the air interface load factor $\eta_{DL}$ can be obtained from the ratio of the total transmission power divided by the maximum available transmission power at the Node B:

$$\eta_{DL} = \frac{\sum_{i=1}^{N_{DL}} P_{TX,i}}{P_{MAX}}.$$

Here $P_{TX,i}$ denotes the transmission power reserved for channelization code i, $N_{DL}$ is the number of downlink channelization codes in use at the cell, and $P_{MAX}$ represents the maximum available transmission power.

It is important to note that this power ratio does not give a measure of how near the system is from the pole capacity [14]. The pole capacity depends also on the received interference plus thermal noise power at the terminals, and when the system approaches the pole, infinite downlink powers would be required to maintain the quality target for all users. This situation should be avoided as the system would become unstable. Assuming that it has been well designed so that the pole is never reached, the purpose of the described downlink load factor is to estimate how near the cell is from its maximum capacity.

As another example, for LTE cells the downlink air interface load factor can be obtained from the average number of occupied resource blocks:

$$\eta_{DL} = \frac{\sum_i N_{PRB,DL}^i + N_{PRB,DL}^{control}}{N_{PRB,DL}^{TOTAL}},$$

where $N_{PRB,DL}^i$ denotes the number of downlink physical resource blocks (PRBs) reserved for user i, $N_{PRB,DL}^{control}$ is the number of downlink PRBs reserved for control channels and physical signals, and $N_{PRB,DL}^{TOTAL}$ is the total available number of downlink PRBs according to the system bandwidth.

2. Uplink air interface load factor. This quantity represents the analogous measure for the uplink air interface.

In WCDMA the load factor may be defined from the so-called rise over thermal (RoT), a quantity representing the ratio of interference power divided by thermal noise power at the Node B:

$$RoT = \frac{\sum_{i=1}^{N_{UL}} P_{RX,i} + I_{other} + P_N}{P_N},$$

where $P_{RX,i}$ denotes the uplink received power from user i at the base station, $N^{UL}$ is the number of active uplink users, $I_{other}$ is the uplink interference from other cells and $P_N$ is the thermal noise. The air interface load factor is thus defined as:

$$\eta_{UL} = 1 - \frac{1}{RoT} = \frac{\sum_{i=1}^{N_{UL}} P_{RX,i} + I_{other}}{\sum_{i=1}^{N_{UL}} P_{RX,i} + I_{other} + P_N}.$$

When the load factor approaches unity, the rise over thermal goes to infinity and the system becomes unstable. The system should therefore not approach the pole capacity. In uplink it is not always possible to ensure this as the number of uplink users is in principle unbounded (hence the RoT); therefore appropriate admission control strategies should exist in order to keep the RoT below a given threshold.

For LTE cells the load factor is analogous to the downlink case:

$$\eta_{UL} = \frac{\sum_i N_{PRB,UL}^i + N_{PRB,UL}^{control}}{N_{PRB,UL}^{TOTAL}}$$

where $N_{PRB,UL}^i$ denotes the number of uplink physical resource blocks (PRBs) reserved for user i, $N_{PRB,UL}^{control}$ is the number of uplink PRBs reserved for control channels and physical signals, and $N_{PRB,UL}^{TOTAL}$ is the total number of uplink PRBs available according to the system bandwidth.

Both downlink and uplink air interface cell loads should be averaged over time in order to filter out spurious load variations due to fading channel characteristics or bursty traffic.

3. Processing cell load. This quantity measures the amount of hardware, CPU and processing resources which are in use by the cell. The processing cell load should be dependent on actual implementations, including e.g. total CPU usage, hardware capabilities or maximum data rate internally supported.

4. Backhaul load. This quantity measures the occupied resources on the relevant interface(s) to other radio access or core network nodes, such as S1 for LTE base stations or Iub for WCDMA base stations.

The combination of the four cell load indications can be based on any particular implementation. The resulting cell load indication should be an integer number in the interval 0 to 100 representing the percentage of used resources.

Cell Selection and Reselection Based on Cell Load:

UEs in Idle mode may take advantage of cell load indications from both serving and neighbour cells for selection and reselection purposes. If no cell load indication is found in the broadcast information from a given cell, the UE may estimate it under certain circumstances as explained in following paragraphs.

If the terminal incorporates the serving and neighbour cells' loads as inputs for cell selection and reselection (in addition to the received signal levels), a simple yet effective idle mode load balancing mechanism is thus accomplished. Even if no traffic is being served to the UE, idle mode signaling procedures (such as UMTS location and routing area updates, or LTE tracking area updates) may consume significant resources in highly loaded cells. Similarly, when macro users are frequently reselecting to an open-access femto cell with a different Location Area/Routing Area Indicator, the resulting Location Area/Routing Area Update messages may be very harmful. Load information may therefore be considered as an additional input for cell selection and reselection purposes.

According to 3GPP [7] [], the terminal may not perform neighbour cells' measurements if the serving signal is above a certain level (namely $S_{intrasearch}$ for intra-frequency measurements and $S_{intersearch}$ for inter-frequency measurements), based on the following relations:

$$S_{rxlev} = Q_{rxlevmeas} - (Q_{rxlev\,min} + Q_{rxlev\,min\,offset}) - P_{compensation}$$

$$S_{qual} = Q_{qualmeas} - (Q_{qual\,min} + Q_{qual\,min\,offset}),$$

where $Q_{rxlevmeas}$ is the measured cell RX level value, $Q_{qualmeas}$ is the measured cell quality value, $Q_{rxlevmin}$ is the minimum required RX level, $Q_{qualmin}$ is the minimum required quality level, $Q_{rxlevminOffset}$ and $Q_{qualminOffset}$ are offsets taken into account when camped in a VPLMN, and $P_{compensation}$ takes sense in situations where the maximum transmit power in the UE is higher than the one given by the power class of the terminal.

The measured cell RX level value and the cell quality value are dependent on the technology considered. In UMTS they are defined as the CPICH RSCP and Ec/No, respectively [8]. In LTE they are measured over the cell reference signals through RSRP and RSRQ, respectively [7].

Many algorithms may be defined to take cell load into consideration. The following sections describe possible cell selection and reselection algorithms based on cell load information.

Cell Selection Based on Cell Load Information:

The criteria defined by 3GPP for both UMTS and LTE cell selection are:

$$S_{rxlev} > 0 \text{ AND } S_{qual} > 0 \Rightarrow \text{camp in the cell}$$

No load information is taken into account. These conditions are known as the S-criterion for received power and quality, respectively [5].

A possible modification would be to incorporate the following cell load criteria, denoting $L_{serving}$ as the cell load and $L_{serving,max}$ as the maximum allowed cell load:

$$S_{rxlev} > 0 \text{ AND } S_{qual} > 0 \text{ AND } L_{serving} < L_{serving,max} \Rightarrow \text{camp in the cell}$$

Figure 6:
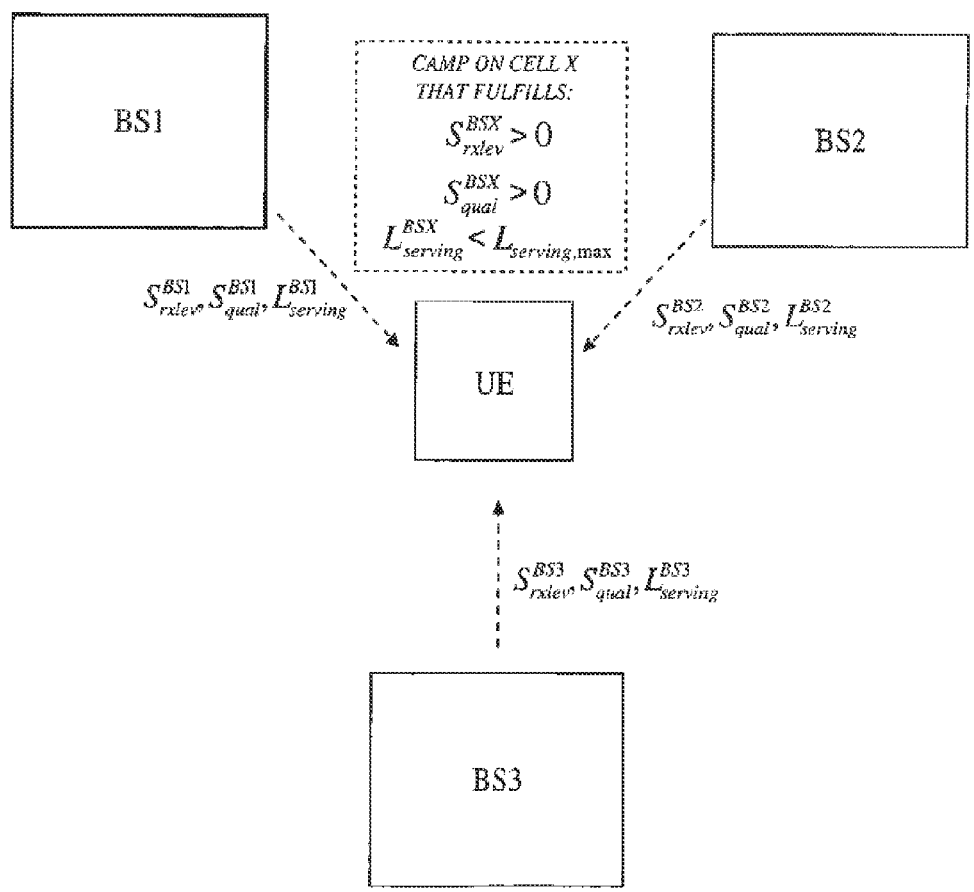
FIG. 6 is an illustration of the proposed cell selection process in an example with three cell candidates.

Hence if the cell load is above a certain threshold, the terminal determines that the cell is highly loaded and evaluates other candidate cells. This threshold may also be broadcast by the cell making use of a suitable System Information Block or any other procedure. FIG. 6 depicts an embodiment of the proposed cell selection process in an example with three cell candidates.

After camping on the cell, and if more than one second has elapsed, the terminal may perform neighbour cells' measurements aimed at possible cell reselections in order to find more suitable cells [14] [5]. Intra-frequency cell reselections should be differentiated from inter-frequency/RAT cell reselections, as explained below.

Intra-frequency Cell Reselection Based on Cell Load Information:

For cell reselection at the same frequency, and if more than one second has elapsed since the last cell selection/reselection, 3GPP defines that no neighbour measurements may be taken by the UE if the following conditions are fulfilled:

$$\left. \begin{array}{l} S_{rxlev} > S_{int\,rasearch,P} \\ S_{qual} > S_{int\,rasearch,Q} \end{array} \right\} \Rightarrow \text{not perform neighbour measurements}$$

where $S_{intrasearch,P}$ and $S_{intrasearch,Q}$ are power and quality thresholds for intra-frequency cell reselection, respectively. If any of the above is not fulfilled, the UE shall perform neighbour cell measurements.

It is possible to change these rules in the following way:

$$\left. \begin{array}{l} S_{rxlev} > S_{int\,rasearch,P} \\ S_{qual} > S_{int\,rasearch,Q} \\ L_{serving} < L_{serving,max} \end{array} \right\} \Rightarrow \text{not perform neighbour measurements}$$

Hence only when the serving cell load is below a threshold $L_{serving,max}$ neighbour cell measurements may not be performed. If the cell load exceeds $L_{serving,max}$ the UE shall consider other cells for reselection.

To speed up the process, a neighbour cell list is provided by the base station in UMTS and LTE, although in the latter case this list is only optional. LTE terminals should then be able to discover new cells even in the absence of a given neighbour cell list.

Given a number of detected cells with their corresponding RX power and quality levels, the terminal checks the accessibility for each of them and compares the cells using a ranking criterion. This ranking may be based on the RX power levels or the quality levels. Cell reselection thus takes place towards the highest ranked cell, i.e. the cell with the highest received power level or quality level, provided a minimum quality for the synchronization signal is fulfilled [5]. Given a serving cell and a number of neighbour cells, the R-criterion as defined in 3GPP standards is given by the quantities [6] [8]:

$$\left. \begin{array}{l} R_s = Q_{meas,s} + Q_{hyst,s} \\ R_n = Q_{meas,n} + Q_{off,n} \end{array} \right\} \Rightarrow \text{choose the cell with highest } R$$

where $Q_{meas,s}$ and $Q_{meas,n}$ represent the quantities measured for serving and neighbour cells respectively (RX power or quality level), and $Q_{hyst,s}$, $Q_{off,n}$ are offsets introduced to avoid ping-pong effects between cells. Given a $R_s$ value for the serving cell and one or several $R_n$ values for the neighbour cells, the terminal reselects to the neighbour cell having the highest $R_n$ value during a time $T_{reselection}$ (also broadcast by the cell) given that it is above the serving value $R_s$.

In this invention it is proposed to use a different criterion for cell reselection. Given that the terminal is able to read the cell load indications from each of the neighbour cells (or, if no cell indication is broadcast, to estimate the downlink air interface cell load), the R-criterion is re-defined as:

$$\left. \begin{array}{l} R_s = 10\log[f(Q_{meas,s}) \times (1 - L_s/100)] + Q'_{hyst,s} \\ R_n = 10\log[f(Q_{meas,n}) \times (1 - L_n/100)] + Q'_{off,n} \end{array} \right\} \Rightarrow$$

choose the cell with highest $R$ where f represents any downlink throughput curve taken as a reference for the technology being considered, and $L_s$ and $L_n$ are the cell loads in serving and neighbour cells (given in %). The quantities $Q_{meas,s}$ and $Q_{meas,n}$ shall be based on signal quality (not power) in order to apply the throughput curve. Offsets $Q'_{hyst,s}$, $Q'_{off,n}$ may in general be different than $Q_{hyst,s}$, $Q_{off,n}$.

The throughput curve could be a Shannon-like curve such as the one considered in 3GPP for system-level evaluations [15]. However any other throughput curve is also possible. The aim of the f curve is to evaluate the hypothetical throughput that would be obtained when cell load information is taken into account, and base the ranking upon the result from that calculation (in addition to the above mentioned offsets). Hence, lower-loaded cells with poor signal levels may get a higher ranking than higher-loaded cells with better signal levels. It is important to note that the throughput obtained from the f curve is fictitious as no connection has yet taken place. However it serves as a comparison between cells, giving an indication of which performance would be obtained if the UE would reselect to that cell.

It is also advisable to consider a minimum quality level for reselection, i.e. the highest ranked cell should only be selected if its quality level is above a certain limit apart from the cell load.

Figure 7:
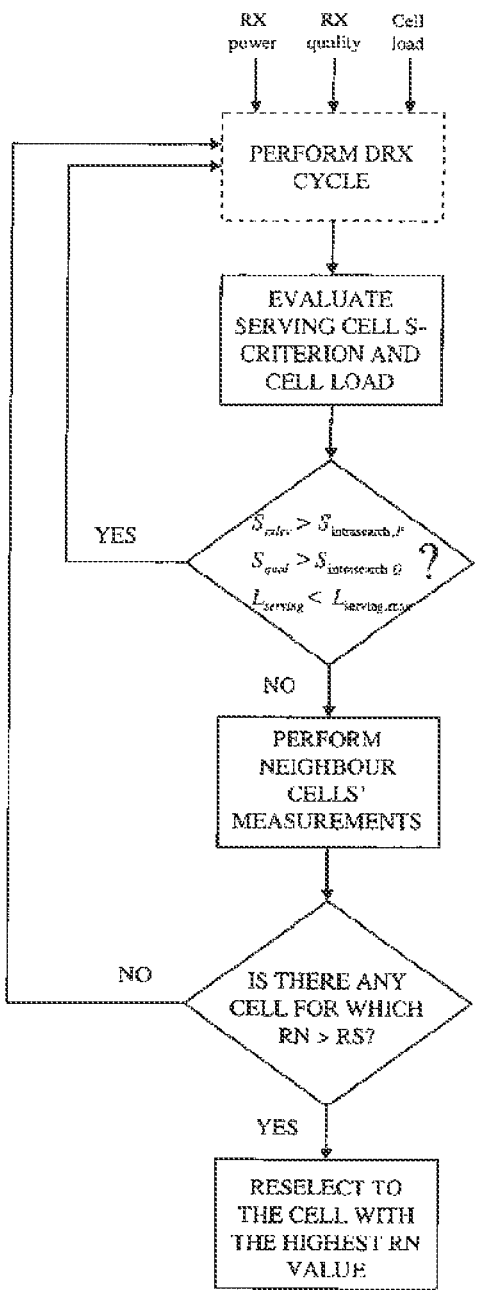
FIG. 7 is a flowchart illustrating the proposed procedure for intra-frequency reselections, according to an embodiment.

FIG. 7 depicts an embodiment of the proposed procedure for intra-frequency reselections. The DRX cycle depicted in dotted lines represents the capability of the terminal to sleep in idle mode, switching off its receiver to save battery hence waking up only at specific times depending on the DRX cycle [5]. After evaluating the serving cell S-criterion and cell load, if the three conditions specified in the figure are fulfilled the UE keeps camping on the serving cell. Otherwise, the UE performs neighbour cell measurements and evaluates if there is another cell for which the R-value is higher than in the serving cell. If so, the UE reselects to the cell having the highest R-value ($R_n$); otherwise the UE keeps camping on the current serving cell.

Other criteria for cell ranking based on cell load are also possible, provided that the cell load indications/measurements are included in the calculations in any suitable way. Variations of the above proposed ranking criteria are also possible depending on the actual technology considered.

Inter-frequency/RAT Cell Reselection Based on Cell Load Information:

In LTE (and UMTS after Release 8) priority-based measurement rules for inter-frequency/RAT cell reselections are defined. Higher priority frequencies must always be measured by the UE, while lower priority frequencies are only measured when the quality of the serving cell is lower than a given threshold ($S_{nonintrasearch}$). Cell reselection for higher priority frequencies is based on the S-criterion, if the target S quantities are higher than a given threshold (in power or quality) during a time $T_{reselection}$ [5]. For lower-priority frequencies, reselections depend on the serving signal levels as well as the target ones.

Measurement rules are proposed to be changed according to the following criteria: higher priority frequencies/RATs shall always be measured, but lower priority frequencies shall be measured when any of the following conditions are not fulfilled:

$$\left. \begin{array}{l} S_{rxlev} > S_{nonintrasearch,P} \\ S_{qual} > S_{nonintrasearch,Q} \\ L_{serving} < L_{serving,max} \end{array} \right\} \Rightarrow \text{not perform neighbour measurements}$$

Hence, if the serving cell load is above a threshold $L_{serving,max}$ measurements shall take place, even if the specified S-criterion is fulfilled.

After taking measurements, it is proposed that higher priority frequencies/RATs are reselected when the following two conditions are fulfilled for the target cell during a time $T_{reselection}$:

$$\left. \begin{array}{l} S_{target} > Thresh_{X,High} \\ L_{target} < L_{target,max} \end{array} \right\} \Rightarrow \text{reselect to that cell.}$$

Hence only when the target cell load is below a maximum $L_{target,max}$ reselection may take place. The S-values may refer to RX power levels or quality levels, as specified by the network.

It is also proposed that lower priority frequencies/RATs are reselected when the following three conditions are fulfilled during a time $T_{reselection}$:

$$\left.\begin{array}{l}S_{serving} < Thresh_{Serving,Low}\\ S_{target} > Thresh_{X,Low}\\ L_{target} < L_{target,max}\end{array}\right\} \Rightarrow \text{reselect to that cell.}$$

Hence, only when the target cell load is below a certain threshold reselection may take place. The S values may again refer to power or quality levels depending on the desired network configuration.

If more than one target cell fulfils the corresponding criteria, a ranking is established for selection of the best cell. As in the intra-frequency case, it is proposed that the R-criterion be re-defined as:

$$\left.\begin{array}{l}R_s = 10\log[f(Q_{meas,s}) \times (1 - L_s/100)] + Q'_{hyst,s}\\ R_n = 10\log[f(Q_{meas,n}) \times (1 - L_n/100)] + Q'_{off,n}\end{array}\right\} \Rightarrow$$

choose the cell with highest $R$.

Given a $R_s$ value for the serving cell and one or several $R_n$ values for the neighbour cells, the terminal reselects to the neighbour cell having the highest $R_n$ value during a time $T_{reselection}$ (also broadcast by the cell) given that it is above the serving value $R_s$. The parameters $Q'_{hyst,s}$, $Q'_{off,n}$ are as defined in the intra-frequency case, and $L_s$, $L_n$ refer to the serving and neighbour cell loads (in %), respectively.

It is important to note that the throughput curve f should depend on the technology considered in the case of inter-RAT cell reselection, e.g. between UMTS and LTE. The purpose of f is to serve as a reference for a combined "signal level+cell load" reselection decision, where lower cell loads might be more favourable (even with worse signal levels) than higher loaded cells. Hence suitable reference curves should be used for each technology.

It is to note that the offsets $Q'_{hyst,s}$, $Q'_{off,n}$ play a very important role. In the absence of them, the UE would always reselect to the cell with the lower load (given the conditions for cell reselection evaluation described above), making it impractical when a given RAT is always less loaded than another one. These offsets avoid this situation and allow a certain degree of flexibility for traffic steering towards a given frequency/RAT (by suitable modification from the OSS).

Figure 8:
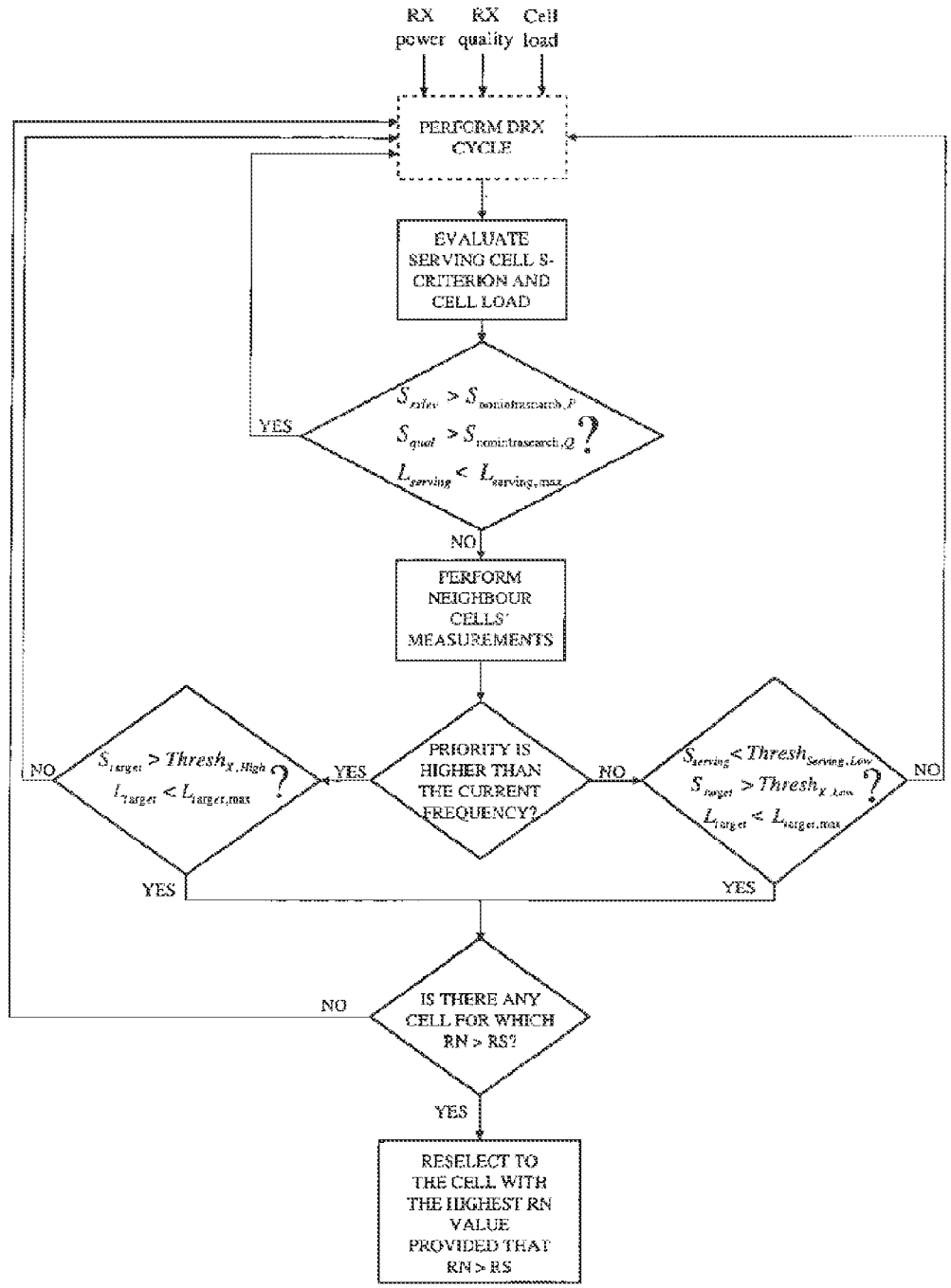
FIG. 8 is a flowchart illustrating the proposed procedure for inter-frequency/RAT reselections, according to an embodiment.

FIG. 8 depicts the proposed procedure for inter-frequency/RAT reselections. After performing the DRX cycle, the UE evaluates the S-criterion and cell load of the cell on which it is camping. If the S-criterion is fulfilled and the load is below a given maximum the UE keeps camping on that cell, and no other measurements are taken; otherwise it performs neighbour cell measurements. If the S-criterion is not fulfilled or the cell load is not below the specified maximum, the cell starts to perform inter-frequency and/or inter-RAT measurements. Decisions are taken depending on the priority of each target frequency/RAT (if priorities are broadcast by the cell). If the priority is higher than that of the current frequency, the S-criterion is evaluated on the target cell as well as its cell load; if it is lower, both S-criteria for the current serving cell and the target cell are evaluated, as well as the target cell load. If the corresponding criteria for reselection are fulfilled, the UE evaluates if there is a cell with a R-value ($R_n$) higher than the one of the current cell ($R_s$); if so, it reselects to the cell having the highest R-value. Otherwise the UE keeps camping on the current cell.

In UMTS prior to Release 8 there are no priorities associated with the system frequencies [14]. In this case, or if no priorities are broadcast by the cell, the reselection process is as described in previous paragraphs for the intra-frequency case (with possibly different associated parameters).

Neighbour Cells Load Report:

In connected mode, mobility is controlled by the network through handovers. Handovers are triggered by proprietary algorithms that depend not only on the measurements reported by the UE but also on implementation-specific policies. Hence, network decisions could conflict with the above described terminal decisions for cell selection and reselection, and ping-pong effects could appear.

In order to avoid this, this invention proposes that the terminal, upon leaving the Idle state, informs the network of the actual cell loads on the detected neighbour cells. This information can be very useful because the serving cell will obtain accurate neighbour cell load information (even from cells of different RATs), without the need of a costly information exchange between network nodes.

Figure 9:
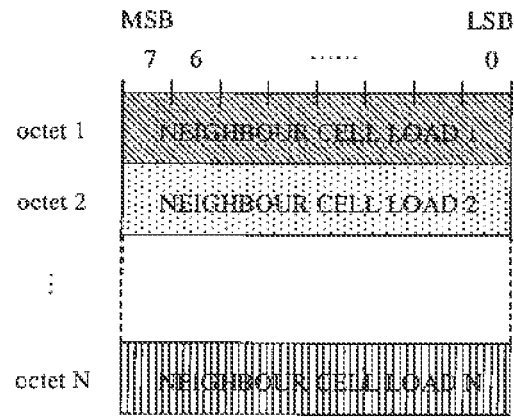
FIG. 9 is a representation of a possible neighbour cells load report.

FIG. 9 depicts an embodiment of a possible neighbour cells load report. Each cell load indication must be an octet (8 bits) representing an integer in the range [0, 100]. The report's length will be a number of octets equal to the number of neighbour cells to consider (N). The cell load indications will be those broadcast by the cells or estimated by the UE through an OTA analysis.

This load report shall be sent by the UE in the following cases:

1. As part of the neighbour cell measurements reported by the UEs in connected mode, when the network instructs the UE to measure possible cell candidates for handover. In this way, the serving cell shall be aware of the neighbour cells' load as well as their respective qualities, in order to incorporate that information as an additional input to the corresponding handover algorithms.
2. When the UE enters connected mode, so that the serving cell can take into account neighbour cells' load information for eventual load balancing procedures.
3. After a successful handover to a different serving cell (known as "target cell"), so as it can also be aware of other cells' load indications. This prevents the target cell from performing a subsequent handover to a different cell if criteria other than the cell load are considered for handover.
4. At any time the serving cell may ask the UE to provide a neighbour cell load report. This can be useful for configuring a given cell load balancing policy by the network.

It is important to note that the contents of the neighbour cells load report may change depending on the situation that triggered the report, because in each case the serving cell shall not be included. Hence, after performing a handover the report will be different than the ones related with normal measurements, because after handover the new serving cell load will not be included and the old serving cell will be one of the neighbour cells.

Estimation of the Downlink Air Interface Load when no Cell Load Information is Broadcast:

There are many situations in which the network may be unable to provide a cell load indication. For example, in legacy RATs the modification of the relevant broadcast information may be an issue as it involves upgrading a significant number of access nodes in order to provide real-time cell load information.

In these cases it is still possible to make an estimation of the downlink air interface load from the UE. This estimation will be more or less accurate depending on the radio conditions, the time spent by the terminal to perform the measurements, the technology considered and the discontinuous reception (DRX) parameters, among other factors.

Air interface load estimation represents only a part of the combined cell load, however it represents one of its main contributions, and without other explicit cell load information it can be a very useful measure giving an idea of the global expected cell load.

Two methods are proposed in this invention to estimate the downlink air interface load, for WCDMA and LTE cells respectively.

Figure 10:
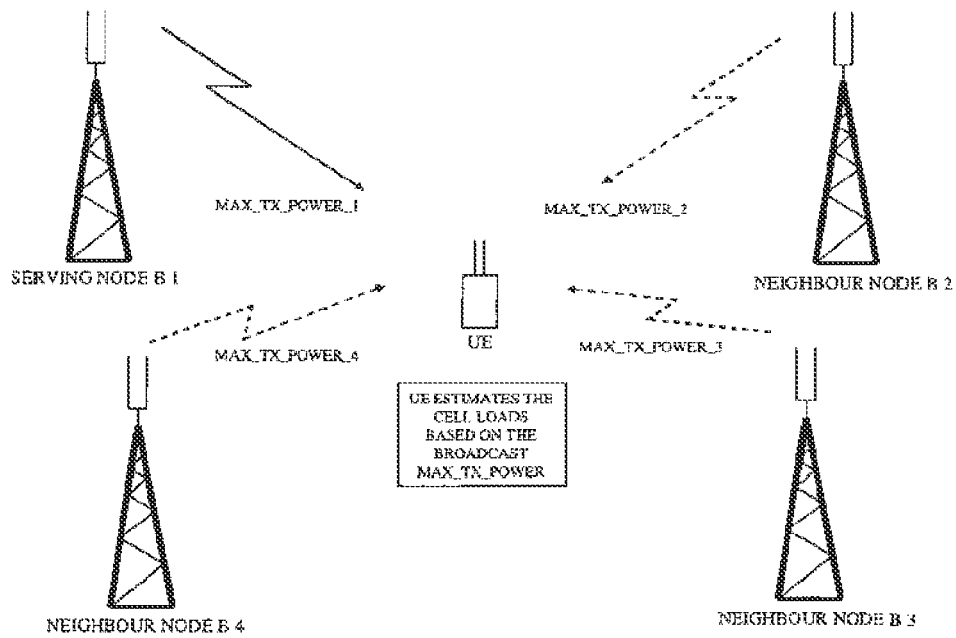
FIG. 10 is a representation of cell load estimation in WCDMA cells.

Cell Load Estimation in WCDMA Cells:

In this case it is yet needed that the Node Bs broadcast a semi-static parameter with an indication of the maximum available TX power in the cell, namely "MAX_TX_POWER" (see FIG. 10). The broadcast of this parameter requires a modification of any suitable Information Element to include it. Such semi-static parameter may be configured directly from the OSS, contrary to the cell load indication which had to be updated in a dynamic way.

The rationale for this parameter is as follows. WCDMA technology is characterized by the use of so-called channelization codes for separation of the physical channels, which are orthogonal by construction (although part of the orthogonality is lost in multipath channels). The number of physical codes in use by the downlink is naturally limited by the maximum cell power: as each channelization code spends a given amount of power (which may also be variable due to fast power control), the downlink capacity of the cell is limited by the available power.

Therefore, a useful measure of the cell load is given by the equation:

$$\eta_{DL} = \frac{\sum_{i=1}^{N_{DL}} P_{TX,i}}{P_{MAX}}.$$

Estimation of the amount of transmitted power by the cell thus gives a measure of the occupied downlink resources. The denominator represents the maximum available power in the cell, hence the need for the broadcast of "MAX_TX_POWER".

In order to estimate the cell load, the received CPICH power $P_{CPICH,RX}$ serves as a first step as it can easily be measured (it is one of the basic measurements for cell reselections in UMTS). The transmitted CPICH power may also be obtained by means of the Information Element "CPICH Tx power" contained in System Information Block type 5 or type 6 [9]. This quantity is broadcast for estimation of the downlink path loss in open loop power control, and may be denoted as $P_{CPICH,TX}$. If the received CPICH power is appropriately averaged over time, subtraction of both quantities gives an estimation of the average path loss:

$PL(dB) = P_{CPICH,TX}(dBm) - P_{CPICH,RX}(dBm).$

The estimated PL may be used to derive the transmitted power for the rest of downlink channels from their corresponding received levels. In doing so, control channels and physical signals shall also be included for cell load computation (CPICH, P-CCPCH, SCH, PICH and AICH). These channels are easily detectable since they have predefined channelization codes, not needing a search over the OVSF tree.

Figure 11:
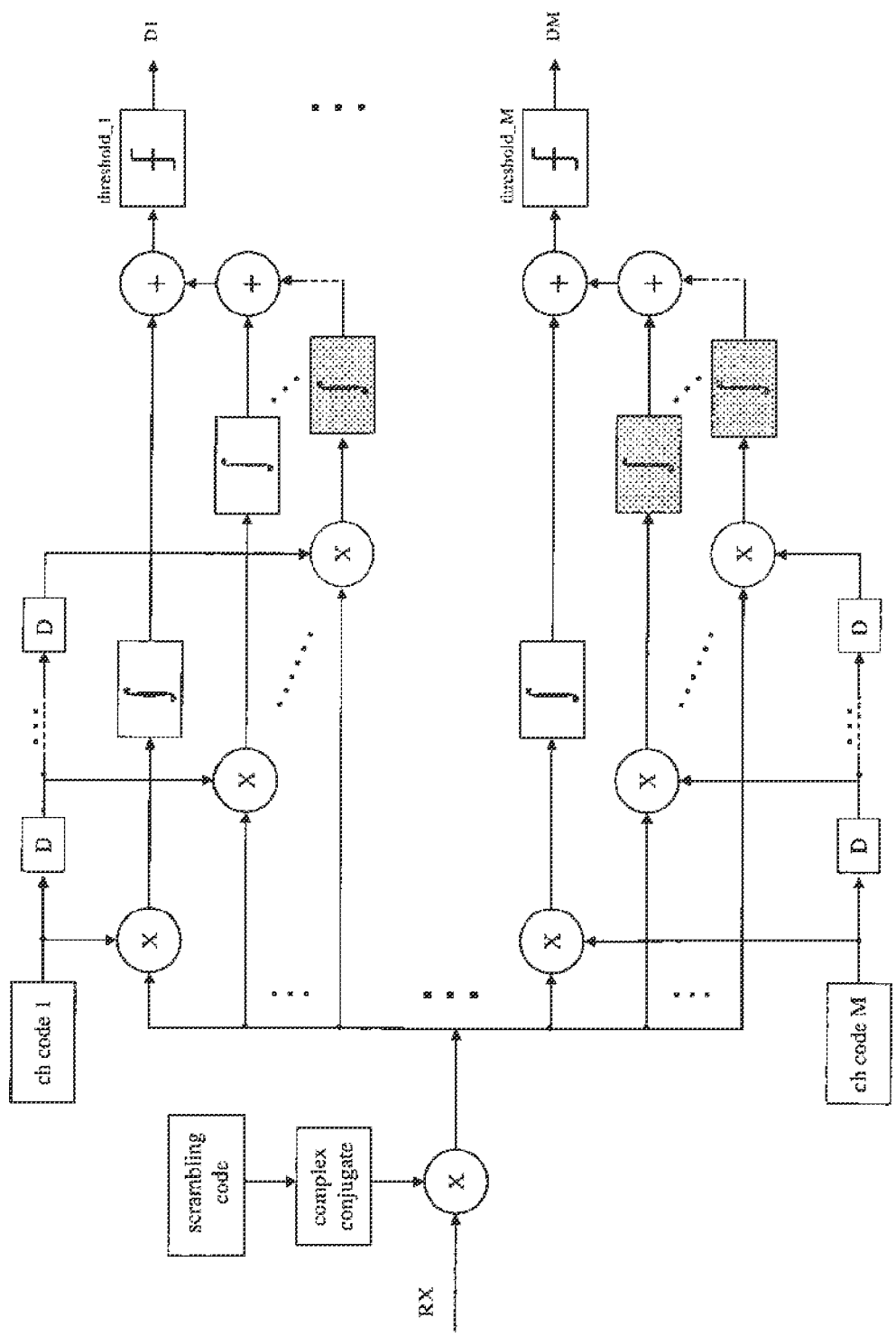
FIG. 11 is a representation of a possible structure for downlink cell load estimation in WCDMA cells, according to an embodiment.

The other contributions to the downlink cell load are DPCCH, DPDCH, HS-PDSCH, S-CCPCH, HS-SCCH, E-AGCH, E-RGCH, and E-HICH. Of all these, the most important ones are those from DPCCH, DPDCH and HS-PDSCH, the former two corresponding to Release 99 DCH channels and the latter corresponding to HSDPA. The received channel powers may be estimated by the UE in a sequential way, running through the OVSF tree [14] and taking note of the available channelization codes at each of the possible spreading factors. Estimation may be done with a bank of correlators followed by a comparison with a suitable threshold (which should be appropriately adjusted). FIG. 11 depicts a possible structure for downlink signal detection.

The received downlink signal at the UE is first multiplied by the complex conjugate of the cell scrambling code, in order to remove its influence. The signal is then passed through a bank of N×M correlators, where N is the maximum delay spread supported by the terminal and M is the number of possible channelization codes in the cell. Each correlator comprises a multiplier by the corresponding channelization code, followed by an integrator. The channelization codes are generated and delayed a number of samples by means of the delay blocks "D", to account for possible multipath in the cell. The outputs from the correlators corresponding to the same channelization code are summed together, to account for the total power received over each code. A threshold comparison is then performed resulting in the binary decision variables D1, D2 . . . DM. Each binary decision variable represents the usage of a given channelization code which will be taken into account for the cell load calculation, with the aid of parameters threshold_1 to threshold_M. A given code will be considered in use if its power exceeds the corresponding threshold; in that case the resulting power $P_{i,RX}$ will be considered for the calculation of the cell load.

Given the high number of possible channelization codes, estimation can be done in a sequential way by taking advantage of the TTI length (Time Transmission Interval). In Release 99, the TTI can take the values 10, 20, 40 and 80 ms. In HSDPA the TTI is only 2 ms (3 slots). As the TTI represents the minimum time interval for downlink scheduling, measurements should be performed over a minimum interval of 3 slots (7680 chips).

Received power estimation should be averaged over time in order to filter out variations due to fading or bursty traffic, resulting in a quantity $$\sum_i P_{i,RX}.$$

This quantity may be updated in a slow cycle (in the scale of seconds) due to the relatively slow variations of the traffic.

By taking advantage of the path loss estimation it is possible to derive the total transmitted power:

$$P_{TX}(dBm) = \sum_i P_{i,RX}(dBm) + PL(dB).$$

Other power units can also be used instead of dBm (such as dBW). The downlink cell load estimation is finally obtained by the ratio:

$$L = \frac{P_{TX}(\text{mW})}{P_{TX,MAX}(\text{mW})},$$

where $P_{TX}$ is previously converted to natural power units (e.g. mW), and $P_{TX,MAX}$ corresponds to "MAX_TX_POWER" as broadcast by the cell (also in natural units).

$P_{TX,MAX}$ can be suitably controlled by the operator according to special needs. For example, if some cells need to be offloaded for some reason, it is possible to configure low values of $P_{TX,MAX}$ so that users move to a different cell. Hence, cell load calculation might result in values higher than 100%, and application of the logarithm operation in the previous equations would not yield a valid value. In these cases it can be considered that the corresponding cell has the lowest ranking of all the possible cells.

Cell Load Estimation in LTE Cells:

LTE is characterized by the use of a number of Resource Elements (REs), each of which corresponds to a single OFDM subcarrier in one OFDM symbol. Each user is scheduled a number of REs (grouped by Resource Blocks, a multiple of the RE) over a slot (which comprises a number of OFDM symbols). Occupation of the REs could thus give an estimation of the downlink cell load.

However cell load calculation may become much more difficult than in WCDMA, especially with low SINR values of the target cell. As no differentiation exists between the transmissions from different cells, significant interference may be experienced on those Resource Blocks that are simultaneously used by several eNodeBs. In this case, downlink cell transmissions are differentiated by the use of different scrambling codes, generated from seeds that depend on the Physical Cell Identities (PCIS) of the cells. However, the scrambling code seeds also depend on the Cell Radio Network Temporary Identifier (C-RNTI) of each user, making it impossible to separate transmissions from different cells without a detailed knowledge of the C-RNTI values which would require detailed decoding of appropriate RRC messages. This effect is particularly harmful at the cell edges.

However when the target SINR is high it is possible to perform cell load estimation based on power detection of the REs. Scenarios with a high SINR may appear e.g. when dealing with inter-frequency cell load estimation.

Taking into account that the reference signals employ different orthogonal sequences for each cell, some interference randomization can be achieved. MMSE channel estimation techniques can be employed in order to separate the reference signals from the surrounding noise plus interference [5], with the objective of obtaining the signal power of each Resource Element ($S_{RE}$) at all relevant frequencies instead of the channel transfer functions. As the signal and interference contributions are uncorrelated, it can be written (in natural units):

$$P_{RE} = S_{RE} + I_{RE},$$

where $P_{RE}$ is the total power at the RE, $S_{RE}$ is the signal component and $I_{RE}$ is the interference plus noise contribution. When the SINR is high, $S_{RE} \gg I_{RE}$. It is to note that these quantities are frequency dependent if the radio channel has a coherence bandwidth significantly lower than the system bandwidth. Usual channel estimation techniques allow separation of the desired and interference contributions, hence obtaining suitable estimates of $S_{RE}$ and $I_{RE}$.

It is possible to use this measurement for a threshold-based RE power detection. If no signal was sent by the eNodeB at a given RE, the detected power would be in the order of $I_{RE}$. If a signal was sent at a given RE, the detected power would be in the order of $S_{RE} + I_{RE} \gg I_{RE}$. Hence it is possible to establish a threshold $P_{RE\_threshold}$ between these two quantities for power detection, taking into account that it will depend on the frequency.

As the eNodeB may vary the DL power over the REs (e.g. as a result of ICIC procedures or non-codebook based beam-forming), the threshold $P_{RE\_threshold}$ may be an intermediate value between $I_{RE}$ and $S_{RE} + I_{RE}$. When $P_{RE}$ exceeds $P_{RE\_threshold}$ for a given RE, it will be accounted as an "occupied" RE. The number of occupied REs ($N_{REs,occupied}$), divided by the global number of available REs in the cell ($N_{REs,total}$, which depends on the system bandwidth broadcast in the Master Information Block [5]) gives the cell load:

$$L = \frac{N_{REs,occupied}}{N_{REs,total}}.$$

This measurement should also be averaged over time, e.g. with an appropriate exponential averaging filter.

Figure 12:
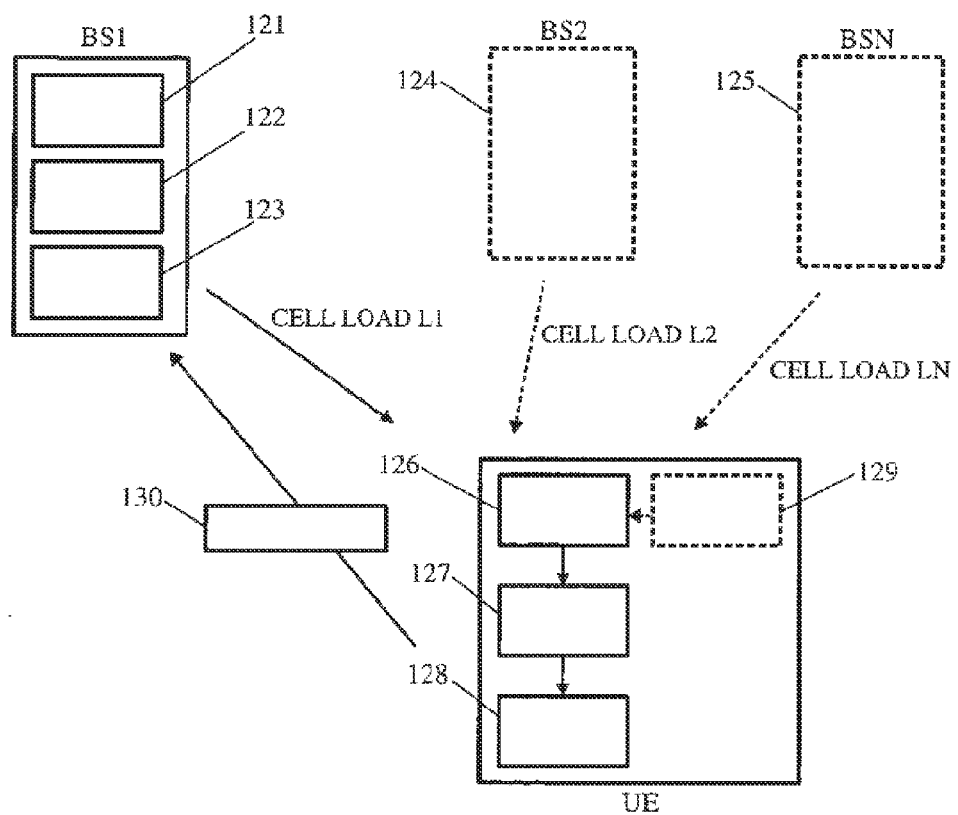
FIG. 12 depicts a possible implementation of the proposed invention, according to an embodiment, in a scenario comprising three base stations (BS1, BS2 and BS3) and a user terminal (UE).

FIG. 12 depicts a possible embodiment for the proposed invention, in a scenario comprising three base stations (namely BS1, BS2 and BS3) and a user terminal (UE).

Base Station BS1 broadcasts an indication of its own cell load L1 through block 121. Similarly, base stations BS2 and BS3 broadcast their cell load indications L2 and L3 (blocks 124 and 125, respectively). The UE evaluates the cell loads as well as the received signal levels (block 126), and performs idle mode cell selection/reselection to the most suitable cell taking into account the broadcast cell load indications (block 127).

The UE constructs the neighbour cells' load report (block 128) that will be sent to the serving cell upon request from the network, after a successful handover, upon entering connected mode or as part of the measurements reports in connected mode (block 130). Optionally, the UE may estimate the air interface cell load (block 129 in dotted lines) if the UE is not able to read and decode the cell load indications, or if no suitable load indications are broadcast by the cells. The serving base station (BS1 in the example of FIG. 12) can receive the neighbour cells' load report (block 122) containing the cell loads of the neighbour cells, in any of the cases described above. This report may be used for any suitable load balancing strategy in connected mode (block 123), taking into account the loads of the neighbour cells.

The depicted base stations may belong to different frequencies or even different radio access technologies (3GPP or non-3GPP), provided that the UE is able to communicate with all of them.

Figure 13:
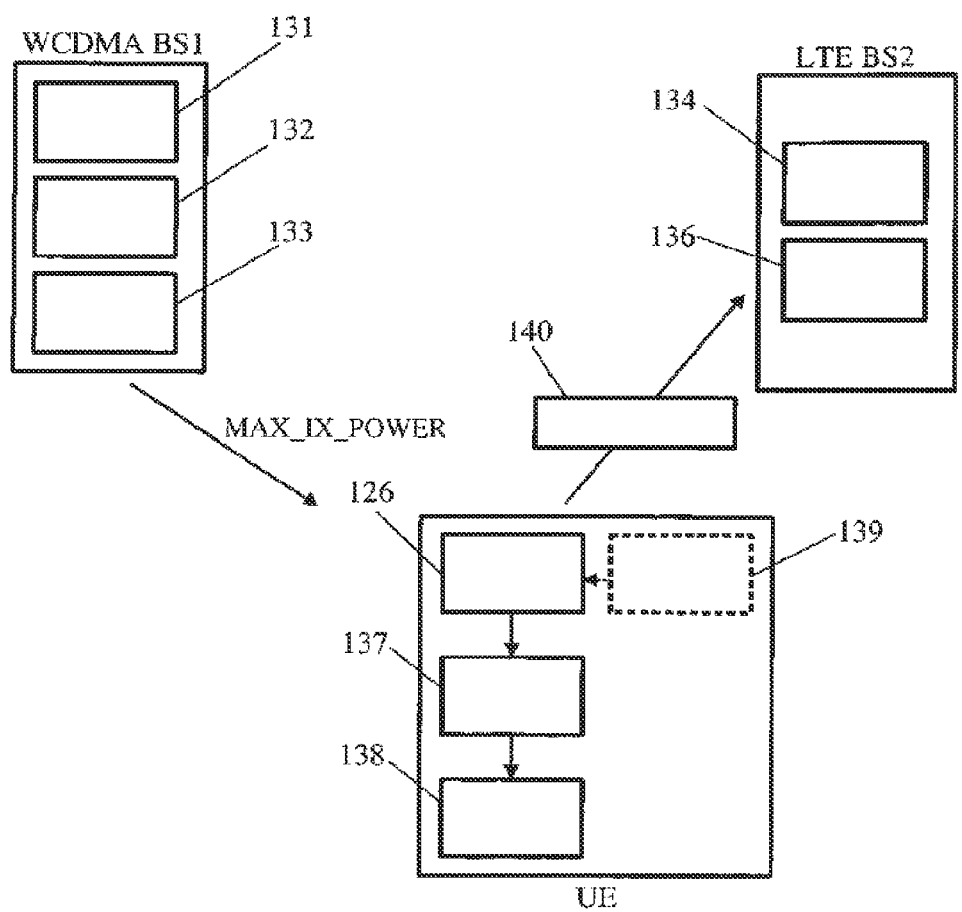
FIG. 13 depicts another possible implementation of the proposed invention, according to an embodiment, where the base stations do not broadcast own cell load indications and the UE tries to estimate the downlink air interface cell loads.

FIG. 13 depicts another embodiment of the present invention, the base stations do not broadcast own cell load indications and the UE tries to estimate the downlink air interface cell loads. In the depicted example BS1 is a WCDMA base station (e.g. a UMTS Node B) and BS2 is an LTE base station (i.e. an eNodeB, in 3GPP terminology).

This scenario implies a much easier upgrade for the network, as cells must not measure and broadcast any cell load indication; however it comes at the expense of more processing requirements for the terminals, which must therefore estimate the air interface cell loads. To do so, WCDMA base stations shall broadcast a semi-static indication of the maximum available transmitted power in the cell ("MAX_TX_POWER", in block 131), so as the UE is able to estimate the cell load. LTE cells however do not have to broadcast any information. The UE estimates the downlink cell loads from both of them (block 139) and, along with the received signal levels, evaluates the parameters needed for cell selection/reselection (block 136).

The UE performs cell selection/reselection according to the previous evaluation (block 137); in the depicted case the LTE cell is selected. The UE constructs the neighbour cells' load report (block 138) and sends it to the serving BS (block 140). BS2, upon reception of the neighbour cells' load report (block 134), can perform any suitable cell balancing strategy in connected mode (block 135). BS1 in this case will not receive such report unless a new reselection/handover to that cell is performed, in which case it will receive the corresponding load report (block 132) and perform any suitable cell balancing strategy (block 133).

The proposed embodiments may be implemented as any suitable combination of hardware elements, software elements or firmware elements, according to implementation needs.

Advantages of the Invention:

In this invention a cell load balancing mechanism is proposed having the advantage of not requiring any interaction between network nodes, which would be very problematic especially in heterogeneous networks with multiple coexisting access technologies. Interaction between network nodes is usually required for load information exchange between the access nodes, aimed at establishing a common policy for traffic steering. This invention proposes a cell load balancing procedure that employs the terminals as anchor nodes, so that accurate and up to date cell load information can be taken into account for specific RRM strategies.

Each access node must only broadcast a cell load indication on a suitable broadcast control channel, based on the combined air interface load, backhaul load and processing load of the cell. The cell load indications can therefore be collected by the terminals and sent back to the network, so that each cell has real-time load information of the neighbour cells. Additionally, an idle mode load balancing procedure is proposed aimed at selecting the best cells for camping that takes the cell load indications into account. Contrary to existing proposals, in this invention cell load indications are employed so as to enforce effective load balancing strategies for UEs in both idle mode and connected mode states.

Idle mode load balancing is an important issue in present wireless networks. Even if the terminals do not transmit any data in idle mode, camping on a highly loaded cell may cause significant signaling traffic (due to e.g. location area updates, routing area updates or tracking area updates) and eventual handovers after entering connected mode.

The proposed invention can be deployed in heterogeneous networks, irrespective of the interfaces between nodes or the type of technology considered. Combined load balancing strategies are very difficult to perform in heterogeneous networks comprising multiple access technologies, frequencies and/or cell layers. The proposed solution describes a common framework where the terminals serve as common linking points between the access nodes, taking advantage of the intrinsic interoperability of the terminals with the network.

Additionally, procedures for estimating downlink air interface load are described for WCDMA and LTE access technologies. These mechanisms may aid in the process of cell selection and reselection when no available cell load indications are broadcast by the network.

A person skilled in the art could introduce changes and modifications in the embodiments described without departing from the scope of the invention as it is defined in the attached claims.

ACRONYMS

2G Second Generation
3G Third Generation
3GPP Third Generation Partnership Project
ABS Almost Blank Subframe
AICH Acquisition Indicator Channel
ANDSF Access Network Discovery and Selection Function
BCCH Broadcast Control Channel
BS Base Station
CDMA Code Division Multiple Access
CPICH Common Pilot Channel
CPU Central Processing Unit
C-RNTI Cell-Radio Network Temporary Indicator
DCH Dedicated Channel
DL Downlink
DPCCH Dedicated Physical Control Channel
DPDCH Dedicated Physical Data Channel
DRX Discontinuous Reception
E-AGCH E-DCH Absolute Grant Channel
E-DCH Enhanced Dedicated Channel
E-HICH E-DCH HARQ Acknowledgement Indicator Channel
E-RGCH E-DCH Relative Grant Channel
EUL Enhanced Uplink
GPRS General Packet Radio System
GSM Global System for Mobile Communications
H-ARQ Hybrid Automatic Repeat Request
HetNet Heterogeneous Network
HSDPA High Speed Downlink Packet Access
HSPA High Speed Packet Access
HS-PDSCH High Speed Physical Downlink Shared Channel
HS-SCCH High Speed Shared Control Channel
HSUPA High Speed Uplink Packet Access
ICIC Inter Cell Interference Coordination
IEEE Institute for Electrical and Electronics Engineering
I-WLAN Interworking with Wireless Local Area Networks
LTE Long Term Evolution
MIB Master Information Block
MMSE Minimum Mean Squared Error
OFDM Orthogonal Frequency Division Multiplex
OSS Operations System and Support
OTA Over The Air
OVSF Orthogonal Variable Spreading Factor
P-CCPCH Primary Common Control Physical Channel
PCI Physical Cell Identity
PICH Pilot Channel
PL Path Loss
PRB Physical Resource Block
RAN Radio Access Network
RAT Radio Access Technology
RE Resource Element
RIM RAN Information Management
RoT Rise Over Thermal
RRC Radio Resource Control
RRM Radio Resource Management
RSCP Received Signal Code Power
RSRP Reference Signal Received Power
RSRQ Reference Signal Received Quality
SCH Synchronization Channel
S-CCPCH Secondary Common Control Physical Channel
SIB System Information Block SINR Signal to Interference and Noise Ratio
TTI Time Transmission Interval
UE User Equipment
UL Uplink
UMTS Universal Mobile Telecommunication System
VoLTE Voice Over LTE
VPLMN Visited Public Land Mobile Network
WCDMA Wideband Code Division Multiple Access
WiMAX Wireless Microwave Access
WLAN Wireless Local Area Networks

REFERENCES

[1] 3GPP TS 25.401, UTRAN Overall Description (Release 99)
[2] 3GPP TS 25.308, High Speed Downlink Packet Access (HSDPA); Overall Description; Stage 2 (Release 5)
[3] 3GPP TS 25.309, FDD Enhanced Uplink; Overall Description; Stage 2 (Release 6)
[4] 3GPP TS 36.300, Evolved Universal Terrestrial Radio Access (E-UTRA) and Evolved Universal Terrestrial Radio Access Network (E-UTRAN); Overall Description, Stage 2 (Release 8)
[5] S. Sesia, I. Toufik, M. Baker (editors), "LTE, the UMTS Long Term Evolution: From Theory to Practice", John Wiley & Sons, 2009
[6] 3GPP TS 36.304, Evolved Universal Terrestrial Radio Access (E-UTRA), "User Equipment (UE) Procedures in Idle Mode (Release 10)"
[7] 3GPP TS 36.331, Evolved Universal Terrestrial Radio Access (E-UTRA), "Radio Resource Control (RRC); Protocol Specification (Release 10)"
[8] 3GPP TS 25.304, "User Equipment (UE) procedures in idle mode and procedures for cell reselection in connected mode (Release 7)"
[9] 3GPP TS 25.331, "Radio Resource Control (RRC) Protocol Specification (Release 7)"
[10] 3GPP TS 24.312, "Access Network Discovery and Selection Function (ANDSF) Management Object (MO) (Release 10)"
[11] 3GPP TS 24.327, "Mobility between 3GPP Wireless Local Area Network (WLAN) interworking (I-WLAN) and 3GPP systems; General Packet Radio System (GPRS) and 3GPP I-WLAN aspects; Stage 3 (Release 8)"
[12] Klaas Wieringa, "IEEE 802.11u Overview", TF-Mobility, 2009
[13] "LTE Advanced: Heterogeneous Networks", Qualcomm, 2011
[14] H. Holma, A. Toskala, "WCDMA for UMTS: Radio Access for Third Generation Mobile Communications", Third edition, Wiley 2004
[15] 3GPP TR 36.942, Evolved Universal Terrestrial Radio Access (E-UTRA), "Radio Frequency (RF) System Scenarios (Release 9)"
[16] 3GPP2 TSG-A WG3, "iRAT SON in 3GPP", February 2012

The invention claimed is:

1. A method for implementing a cell load balancing mechanism for wireless networks including a plurality of network cells, each of said plurality of network cells comprising a base station, by at least one wireless user equipment (UE) connected through a wireless network to a serving base station, the method comprising said at least one wireless UE performing actions comprising:

estimating cell loads of the serving base station and of the plurality of network cells by analyzing a downlink air interface load, wherein in case of Wideband Code Division Multiple Access (WCDMA) cells, said downlink air interface load is determined based on a maximum available TX power in the cell (MAX_TX_POWER, said MAX_TX_POWER being included as part of any relevant system information blocks transmitted in a broadcast channel or created within a new system information block;

providing, to said wireless network, information about the estimated cell load of said plurality of network cells; and performing a network cell selection based on said estimated cell loads, wherein said network cell selection is performed without any exchange of cell load between said plurality of network cells.

2. The method according to claim 1, wherein said estimation of the downlink air interface load (L) is given by the following equation:

$$L = \frac{P_{TX}}{\text{MAX\_TX\_POWER}},$$

wherein $P_{TX}$ denotes a total transmission power as derived from received powers for each of channelization codes i, $P_{i,RX}$, and an estimated path loss PL through the equations:

$$P_{TX}(dBm) = \sum_i P_{i,RX}(dBm) + PL(dB)$$

$$PL(dB) = P_{CPICH,TX}(dBm) - P_{CPICH,RX}(dBm),$$

where $P_{CPICH,TX}$ denotes a transmitted power of a Common Pilot Channel (CPICH) as broadcast by the network cell, and $P_{CPICH,RX}$ is a received CPICH power.

3. The method according to claim 1, further comprising estimating said downlink air interface load in a case of Long Term Evolution cells based on an averaged number of occupied resource elements in a subframe.

4. The method according to claim 3, wherein said estimation of the downlink air interface load (L) is given by the following equation:

$$L = \frac{N_{REs,occupied}}{N_{REs,total}},$$

where $N_{REs,occupied}$ denotes a number of occupied resource elements, $N_{REs,total}$ denotes a global number of available resource elements in the network cell, and resource elements are considered to be occupied based on a detected power being higher than a predefined threshold.

5. The method according to claim 1, wherein said at least one wireless UE is configured to perform a further selection termed reselection.

6. The method according to claim 5, wherein said at least one wireless UE is configured to perform said cell selection and reselection while in Idle mode.

7. The method according to claim 5, further comprising performing said cell reselection by the following criterion:

$$\left. \begin{array}{l} R_s = 10\log[f(Q_{meas,s}) \times (1 - L_s/100)] + Q'_{hyst,s} \\ R_n = 10\log[f(Q_{meas,n}) \times (1 - L_n/100)] + Q'_{off,n} \end{array} \right\} \Rightarrow$$

where said wireless UE chooses a cell with highest R value, and:

f represents any downlink throughput curve taken as a reference for a technology being considered;

$L_s$ and $L_n$ are the cell loads in serving and neighbor cells;

$Q'_{hyst,s}$ and $Q'_{off,n}$ are hysteresis values applied for calculation of R in the serving and neighbor cells respectively; and $Q_{meas,s}$ and $Q_{meas,n}$ are based on signal quality in order to apply the throughput curve.

8. The method according to claim 1, further comprising said at least one wireless UE sending a neighbor cells load report to the serving base station containing the cell load estimations of the plurality of network cells.

9. The method according to claim 8, further comprising said at least one wireless UE sending said neighbor cells load report to the serving base station occurs upon entering, by said at least one wireless UE, into connected mode.

10. The method according to claim 8, wherein said at least one wireless UE sending said neighbor cells load report to the serving base station occurs upon request from said serving base station.

11. The method according to claim 8, wherein said at least one wireless UE sending said neighbor cells load report to the serving base station occurs upon a previous serving base station having sent a handover order to said at least one wireless UE.

12. The method according to claim 8, further comprising sending a neighbor cells load report to the serving base station at any time when said at least one wireless UE is in connected mode.

13. The method according to claim 1, wherein said cell load estimation of each one of said plurality of network cells comprises determining an integer from 0 to 100 representing an estimation of the load of the cell.

14. The method according to claim 1, further comprising performing said network cell selection by incorporating a cell load threshold criteria, and avoiding, by the at least one wireless UE, selection of a cell if the estimated cell load of said cell is above said threshold criteria.

15. The method according to claim 1, wherein said serving base station and at least one neighbor base station are configured to belong to a same frequency and/or to a same radio access technology.

16. The method according to claim 1, wherein said serving base station and at least one neighbor base station are configured to belong to different frequencies and/or to different radio access technologies.

17. A method for implementing a cell load balancing mechanism for wireless networks including a plurality of network cells, each of said plurality of network cells comprising a base station, by at least one wireless user equipment (UE) connected through a wireless network to a serving base station, the method comprising said at least one wireless UE performing actions comprising:

estimating cell loads of the serving base station and of the plurality of network cells by analyzing a downlink air interface load, wherein in a case of Long Term Evolution cells, said estimating said downlink air interface load is based on an averaged number of occupied resource elements in a subframe;

providing, to said wireless network, information about the estimated cell load of said plurality of network cells; and performing a network cell selection based on said estimated cell loads, wherein said network cell selection is performed without any exchange of cell load between said plurality of network cells.

* * * * *